(12) United States Patent
Bird

(10) Patent No.: US 10,173,533 B1
(45) Date of Patent: Jan. 8, 2019

(54) FORCED AIR BATTERY CHARGING SYSTEM

(71) Applicant: Brett W. Bird, Hurst, IL (US)

(72) Inventor: Brett W. Bird, Hurst, IL (US)

( * ) Notice: Subject to any disclaimer, the term of this patent is extended or adjusted under 35 U.S.C. 154(b) by 0 days.

(21) Appl. No.: 15/952,827

(22) Filed: Apr. 13, 2018

(51) Int. Cl.
*B60L 8/00* (2006.01)
*B60L 11/18* (2006.01)
*F03D 3/00* (2006.01)
*F03D 3/06* (2006.01)
*F03D 9/11* (2016.01)
*F03D 9/25* (2016.01)
*F03D 9/32* (2016.01)
*F03D 3/04* (2006.01)
*H02K 7/18* (2006.01)
*H02K 11/00* (2016.01)
*H02K 11/04* (2016.01)
*H02K 7/11* (2006.01)
*B60K 16/00* (2006.01)

(52) U.S. Cl.
CPC .............. *B60L 8/006* (2013.01); *B60K 16/00* (2013.01); *B60L 11/1809* (2013.01); *F03D 3/002* (2013.01); *F03D 3/0427* (2013.01); *F03D 3/061* (2013.01); *F03D 9/11* (2016.05); *F03D 9/25* (2016.05); *F03D 9/32* (2016.05); *H02K 7/11* (2013.01); *H02K 7/183* (2013.01); *H02K 11/0094* (2013.01); *H02K 11/046* (2013.01); *B60K 2016/006* (2013.01); *F05B 2220/31* (2013.01); *F05B 2220/7068* (2013.01); *F05B 2240/221* (2013.01); *F05B 2240/30* (2013.01); *F05B 2250/5011* (2013.01)

(58) Field of Classification Search
CPC ........ B60L 8/00; B60L 8/006; B60L 11/1809; B60L 11/1814; B60K 16/00; B60K 2016/006; F03D 9/11; F03D 9/25; F03D 9/32; F03D 3/002; F03D 3/0427; F03D 3/061; H02K 7/11; H02K 7/183; H02K 11/0094; H02K 11/046; F05B 2220/31; F05B 2240/221; F05B 2240/30; F05B 2250/5011
USPC ................................ 180/165, 2.1, 2.2, 65.31
See application file for complete search history.

(56) References Cited

U.S. PATENT DOCUMENTS 5,296,746 A    3/1994  Burkhardt
6,857,492 B1 *  2/2005  Liskey ................... B60K 16/00
                                                                180/165

(Continued)

*Primary Examiner* — John D Walters
(74) *Attorney, Agent, or Firm* — Dale J. Ream

(57) ABSTRACT

A forced-air battery charging system for a vehicle having an engine compartment includes a turbine assembly having a casing and a plurality of blades, the casing being positioned forwardly in the engine compartment for operably receiving ambient air as the vehicle travels forwardly and having an outlet expelling the ambient air. The plurality of blades are situated in the casing between the inlet and the outlet and are operable to rotate about an axis when impacted by the received ambient air in a direction askew to the axis. An electricity generator is operatively coupled to the plurality of blades. The system includes an air duct having walls that define a channel having proximal and distal ends, the proximal end being open and in communication with the casing outlet, the distal end being open through which the ambient air exits under the vehicle after passing through the air duct proximal end.

5 Claims, 12 Drawing Sheets

(56) References Cited

U.S. PATENT DOCUMENTS

| | | | |
|---|---|---|---|
| 8,220,570 B1* | 7/2012 | Knickerbocker | B60K 16/00 |
| | | | 180/2.2 |
| 8,509,992 B1 | 8/2013 | Bosworth | |
| 9,103,317 B2 | 8/2015 | Garcia | |
| 9,770,990 B2 | 9/2017 | Guthrie | |
| 2008/0179114 A1* | 7/2008 | Chen | B60K 16/00 |
| | | | 180/2.2 |
| 2011/0169267 A1 | 7/2011 | Chen | |
| 2012/0018231 A1* | 1/2012 | Bakraoui | B60K 16/00 |
| | | | 180/2.1 |
| 2012/0085587 A1* | 4/2012 | Drouin | B60K 16/00 |
| | | | 180/2.2 |
| 2016/0281686 A1 | 9/2016 | Hakeem et al. | |
| 2017/0182998 A1* | 6/2017 | Hatsuda | B60L 11/1862 |

\* cited by examiner

FORCED AIR BATTERY CHARGING SYSTEM

BACKGROUND OF THE INVENTION

This invention relates generally to electricity generation systems and, more particularly, to a battery charging system installed behind the grill of an automobile and configured to receive an air stream through the grill when the automobile is moving forward (i.e. when driving) and operating a high efficiency electrical generator for charging a battery or other electrical systems of the automobile.

With the popularity and importance of electric vehicles, strategies for charging and recharging the vehicle battery or otherwise powering the vehicle are important to consider. Electric car batteries are typically recharged using a home charging plug-in unit, such as a 7 kW home unit. Recharging may take from 30 minutes to 12 hours depending on the size of the battery and recharging apparatus. More recently, there have been attempts to charge an electric vehicle battery using incoming air during forward motion of the car. Although presumably effective for their intended purposes, such systems and proposals have been fraught with inefficiencies so pronounced as to make the electricity generation of minimal efficacy and economically unfeasible.

Therefore, it would be desirable to have a forced-air battery charging system installed behind a grill of an electric vehicle having a turbine that avoids loss of collected air, having a plurality of blades having a honeycomb or pocketed configuration that maximizes air collection, and having an air duct that directs incoming air under the vehicle in an aerodynamic fashion that avoids resistance.

SUMMARY OF THE INVENTION

A forced-air battery charging system for a vehicle having an engine compartment according to the present invention includes a turbine assembly having a casing and a plurality of blades, the casing being positioned forwardly in the engine compartment of the vehicle and having an inlet operably receiving ambient air as the vehicle travels forwardly and having an outlet operably expelling the ambient air. The plurality of blades are situated in an interior space defined by the casing between the inlet and the outlet, the plurality of blades being operable to rotate about an axis when impacted by the received ambient air in a direction askew to the axis. An electricity generator is operatively coupled to the plurality of blades. The system includes an air duct having a plurality of walls that collectively define a channel having proximal and distal ends, the proximal end being open and in fluid communication with the casing outlet, the distal end being open through which the ambient air exits under the vehicle after passing through the air duct proximal end.

Therefore, a general object of this invention is to provide a forced-air battery charging system for mounting behind the grill of an automobile that generates electricity by receiving incoming air through the grill of the automobile when moving forward and operating an electrical generator thereby.

Another object of this invention is to provide a forced-air battery charging system, as aforesaid, that maximizes air reception through pocketed blades and sealed against leakage for maximum efficiency in electricity generation.

Still another object of this invention is to provide a forced-air battery charging system, as aforesaid, having an air duct that guides incoming air under the automobile after passing through the turbine and blades so as to avoid drag.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 11b is a side view of the recharging system and automobile of FIG. 11a.

DESCRIPTION OF THE PREFERRED EMBODIMENT

Figure 1:
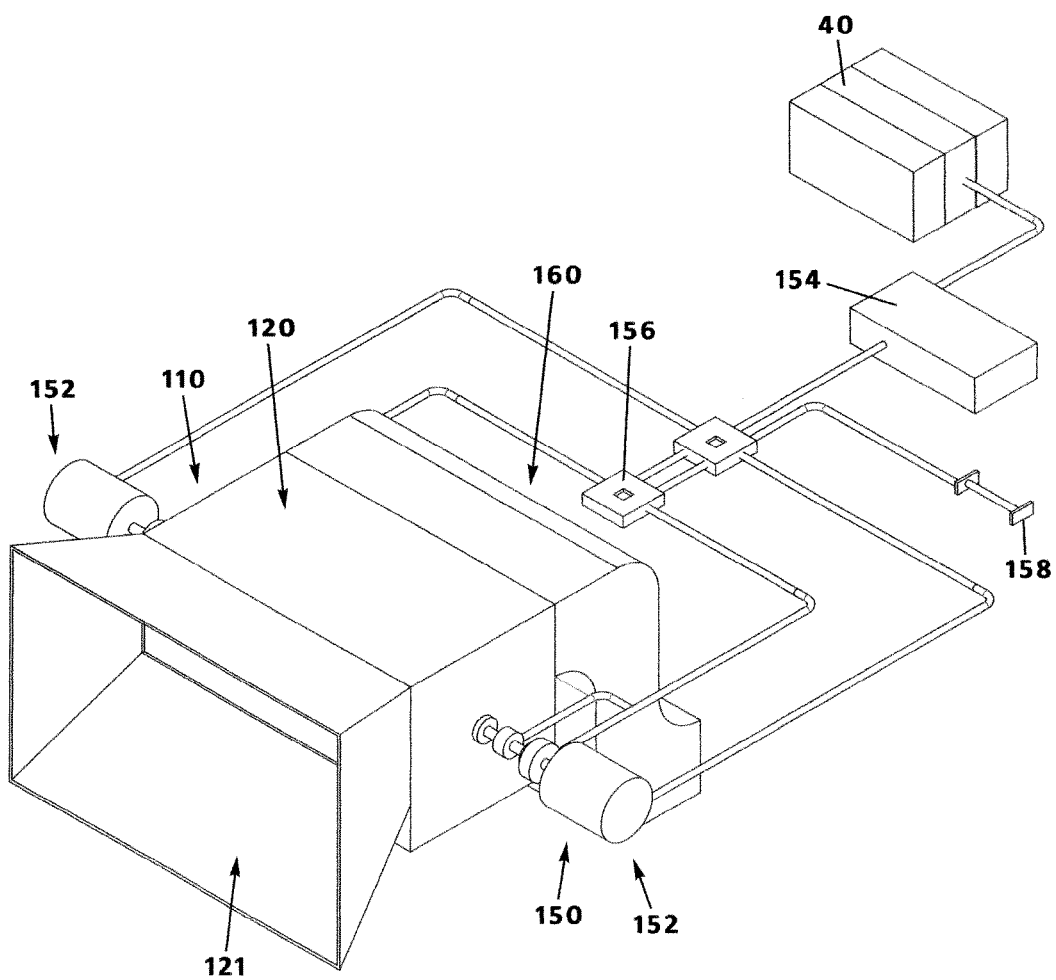
FIG. 1 is a perspective view of a forced-air battery charging system according to a preferred embodiment of the present invention.

A forced-air battery charging system for operation in a vehicle and vehicles having such systems will now be described in details with reference to FIGS. 1 to 11b of the accompanying drawings. A vehicle 10 (FIGS. 11a and 11b) includes an engine compartment 20, a passenger area 30, a battery 40, a plurality of wheels 50 for moving the engine compartment 20 and the passenger area 30, and a forced-air battery charging system 100. The engine compartment 20 may generally be positioned forward of the passenger area 30.

The forced air battery charging system 100 includes a turbine assembly 110 having a casing 120 and a plurality of blades 140, an electricity generator 150 operatively coupled to the plurality of blades 140, and an air duct 160. The casing 120 is positioned in the engine compartment 20 and has an inlet 122 operably receiving ambient air A1 (FIG. 11b) as the vehicle 10 travels forwardly and an outlet 126 operably expelling the ambient air A1. The plurality of blades 140 are situated in an interior space 131 defined by the casing 120 between the inlet 122 and the outlet 126. And the blades 140 are operable to rotate about an axis 141 when impacted by the received ambient air in a direction askew to the axis 141.

Figure 2:
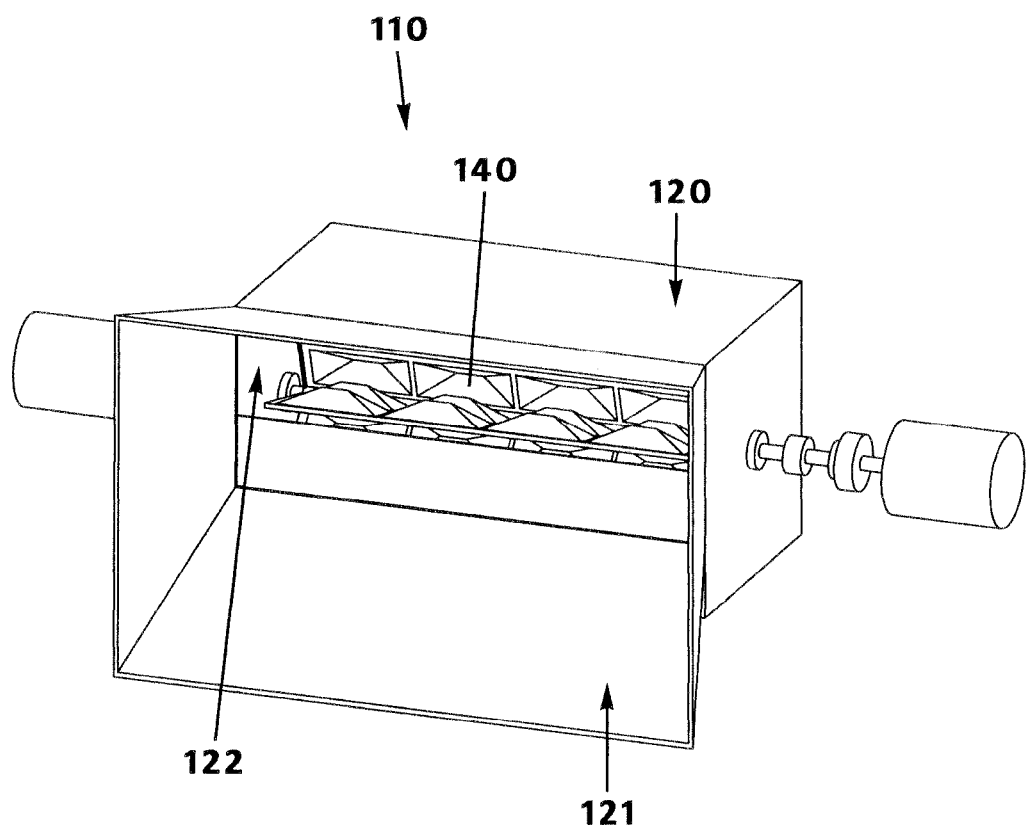
FIG. 2 is a front perspective view of a front portion of the charging system as in FIG. 1.
Figure 3:
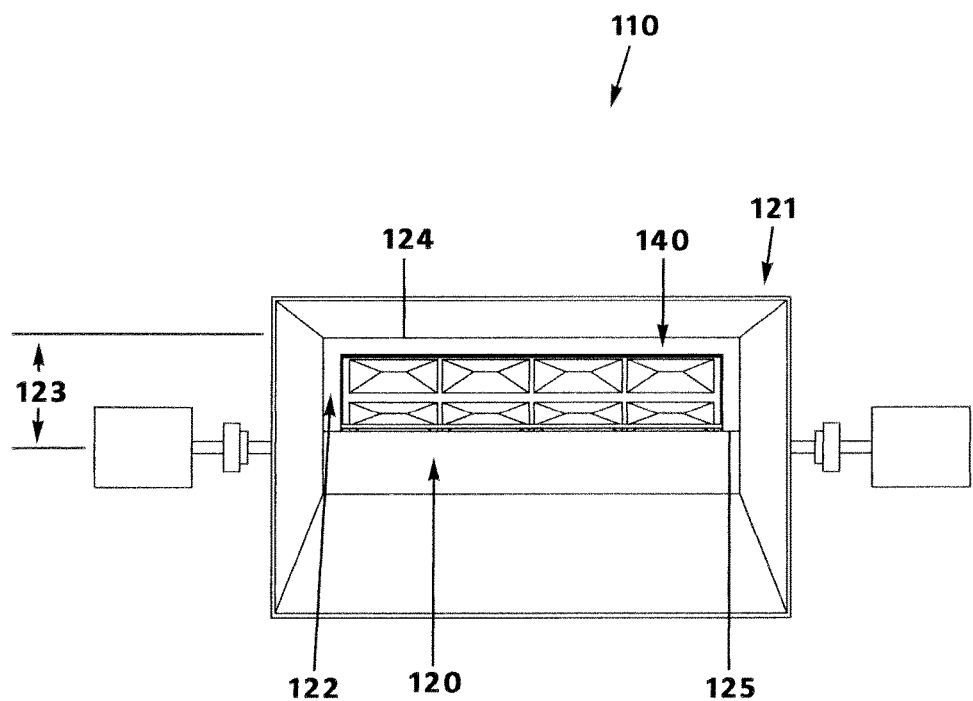
FIG. 3 is a front view of the front portion of the charging system as in FIG. 2.
Figure 4:
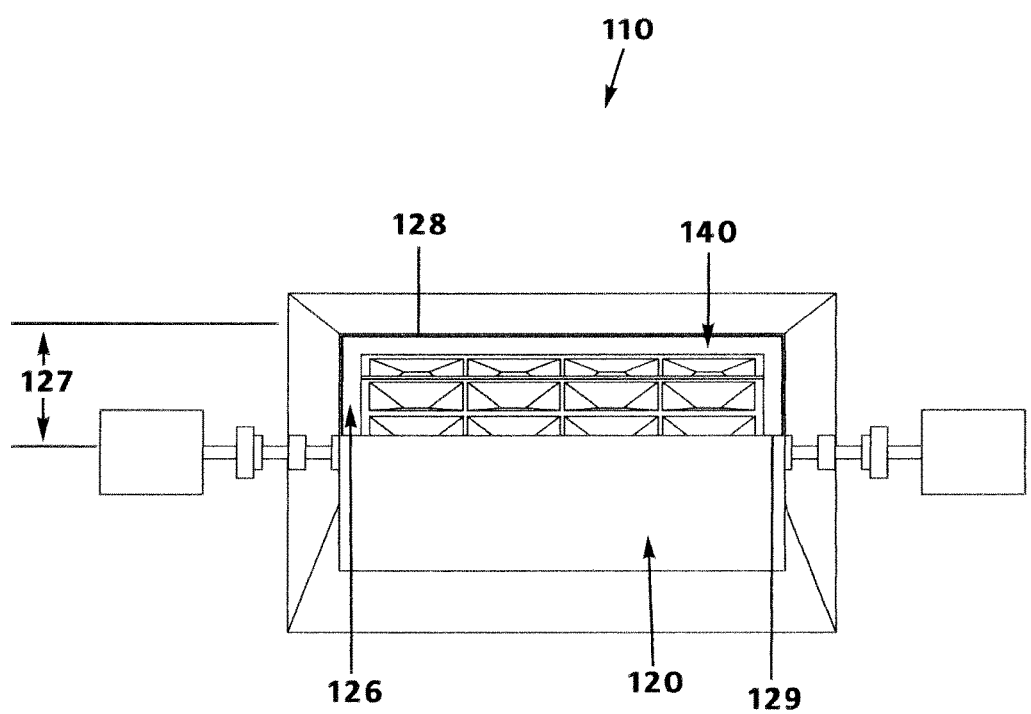
FIG. 4 is a rear view of the turbine assembly of the charging system as in FIG. 2.
Figure 5A:
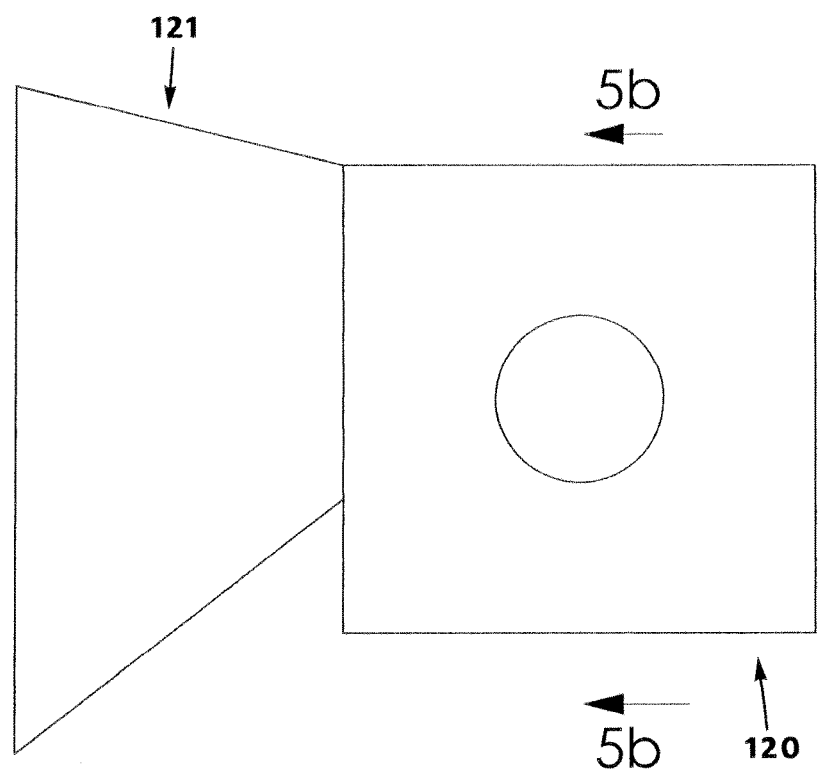
FIG. 5a is a side view of the turbine assembly of the charging system as in FIG. 2.
Figure 5B:
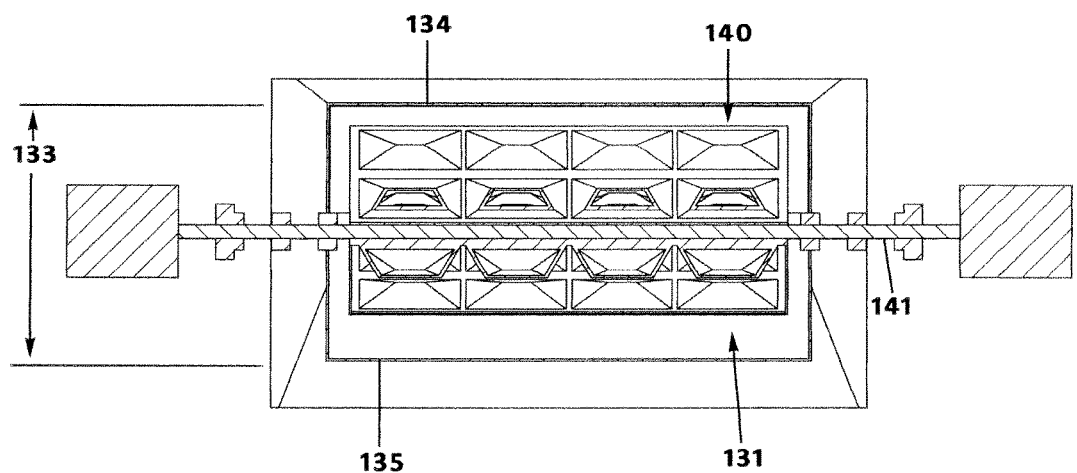
FIG. 5b is a rear view of the turbine assembly of the charging system as in FIG. 3.

The casing inlet 122 is configured to direct the ambient air toward the blades 140 only on one side of the axis 141. And the casing inlet 122 has an overall height 123 (FIG. 3) defined between an uppermost point 124 of the casing inlet 122 and a lowermost point 125 of the casing inlet 122. It may be particularly desirable for the overall height 123 of the casing inlet 122 to be no more than half as large as an overall height 133 (FIG. 5b) of the casing interior space 131 defined between an uppermost point 134 of the casing interior space 131 and a lowermost point 135 of the casing interior space 131. A scoop 121 may be in fluid communication with the casing inlet 122, as shown in FIG. 2, for directing the ambient air A1 toward the casing inlet 122. The casing outlet 126 has an overall height 127 (FIG. 4) defined between an uppermost point 128 of the casing outlet 126 and a lowermost point 129 of the casing outlet 126. It may be particularly desirable for the overall height 127 of the casing outlet 126 to be no more than half as large as the overall height 133 of the casing interior space 131.

Figure 6:
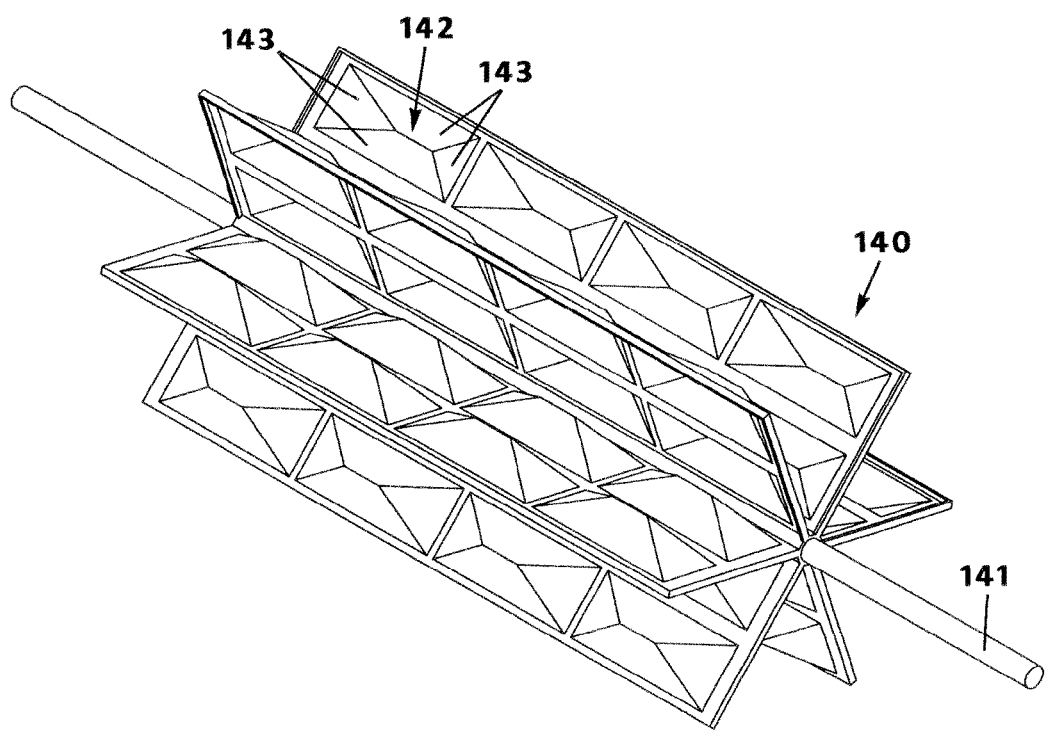
FIG. 6 is a perspective view the plurality of blades of the turbine assembly.
Figure 7:
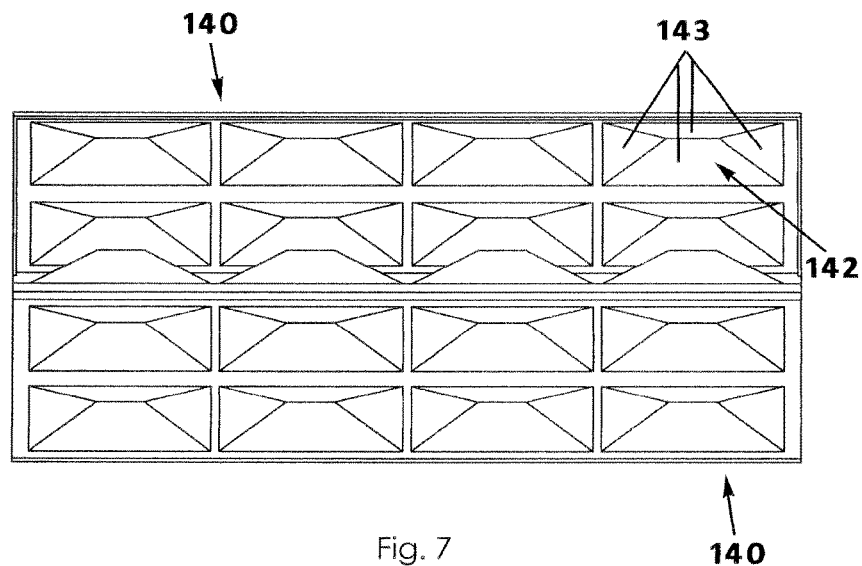
FIG. 7 is a front view of the plurality of blades as in FIG. 6.
Figure 8:
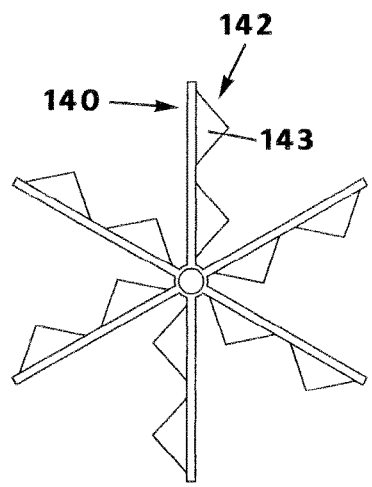
FIG. 8 is a side view of the plurality of blades as in FIG. 6.
Figure 9:
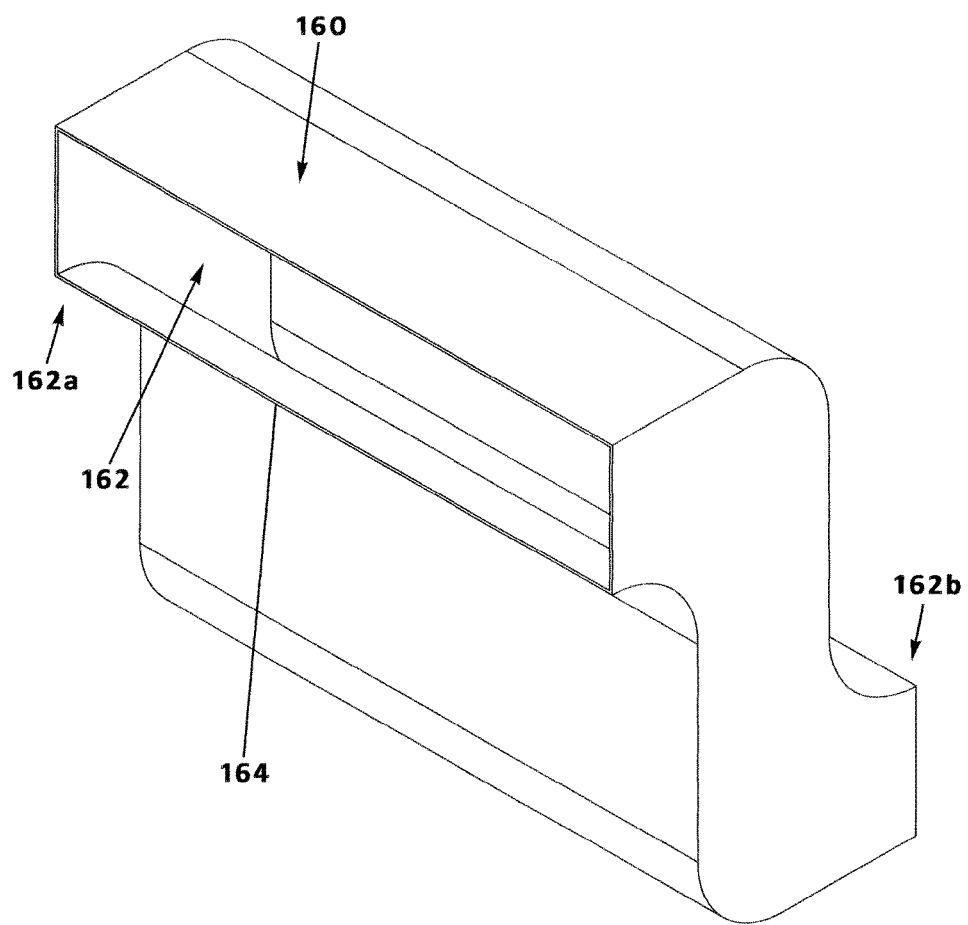
FIG. 9 is an isolated front perspective view of an air duct of the recharging system as in FIG. 1.
Figure 10:
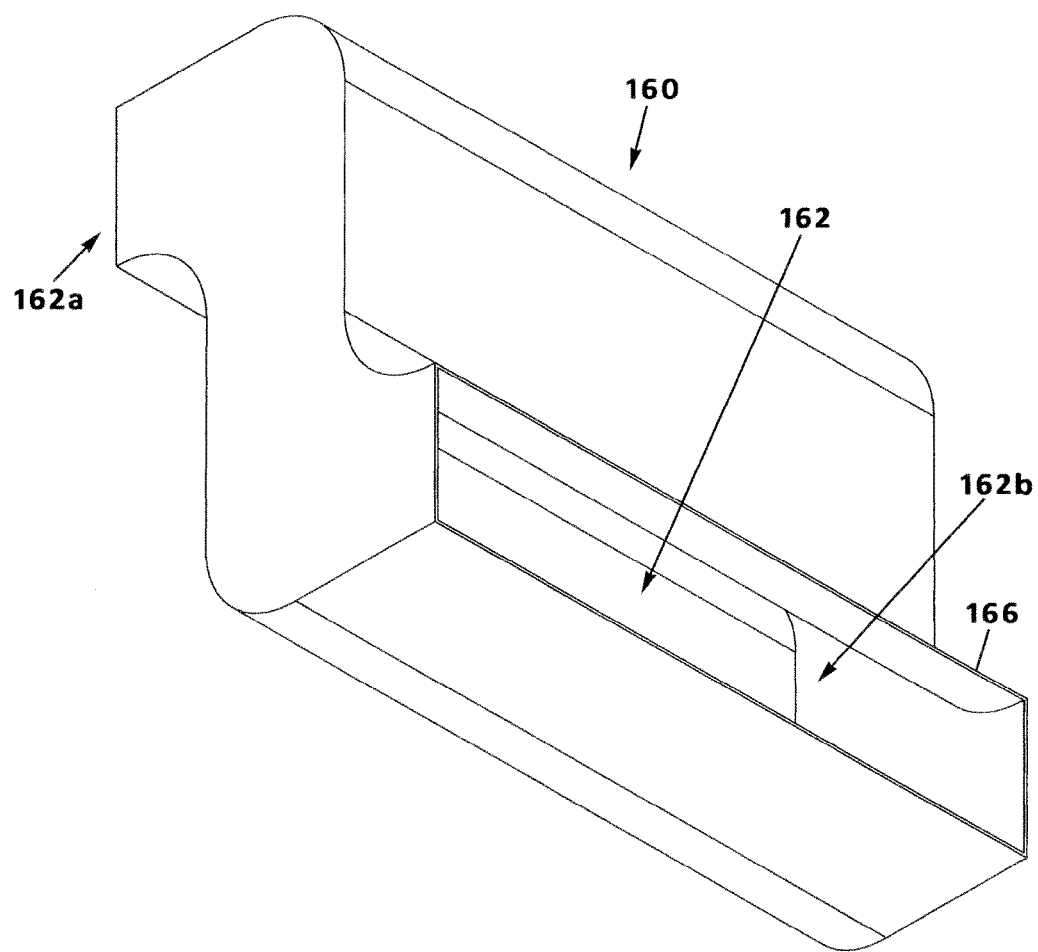
FIG. 10 a rear perspective view of the air duct as in FIG. 9.

Each blade 140 may preferably have at least one concave air pocket 142 positioned to receive a portion of the ambient air A1 therein. And while the concave air pockets 142 may be formed in various ways, it may be preferable for each concave air pocket 142 to be formed from at least four generally planar walls 143 angled relative to one another as best shown in FIGS. 6 through 8. FIGS. 6 and 8 show six blades 140 symmetrically positioned about the axis 141, though additional (or fewer) blades 140 may be used. Similarly, each blade 140 is illustrated as having two rows of four air pockets 142. Having multiple rows of the air pockets 142, and especially in conjunction with the configuration of the planar walls 143 defining the individual air pockets 142, may be particularly desirable and beneficial in turning the blades 140 about the axis 141 from interaction with the passing ambient air A1. But in other embodiments, a different number of rows may be used (including a single row), and each row may have a different number of the concave air pockets 142.

The electricity generator 150 may include, for example, a permanent magnet generator 152 in selective communication with the battery 40. The embodiment 100 includes a pair of permanent magnet generators 152 with an inverter or rectifier 154 between the permanent magnet generators 152 and the battery 40 and with an electromagnet clutch 156 placing the permanent magnet generators 152 in selective communication with the battery 40. The electricity generator 150 is further shown with a discharge resistor 158.

Figure 11A:
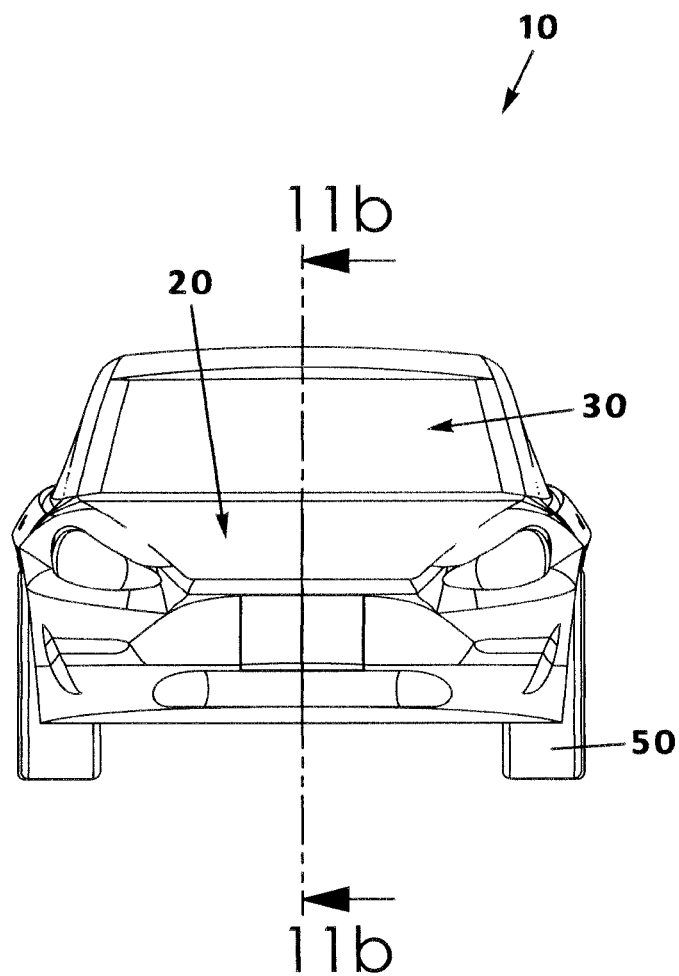
FIG. 11a is a front view of the recharging system installed on an automobile.
Figure 11B:
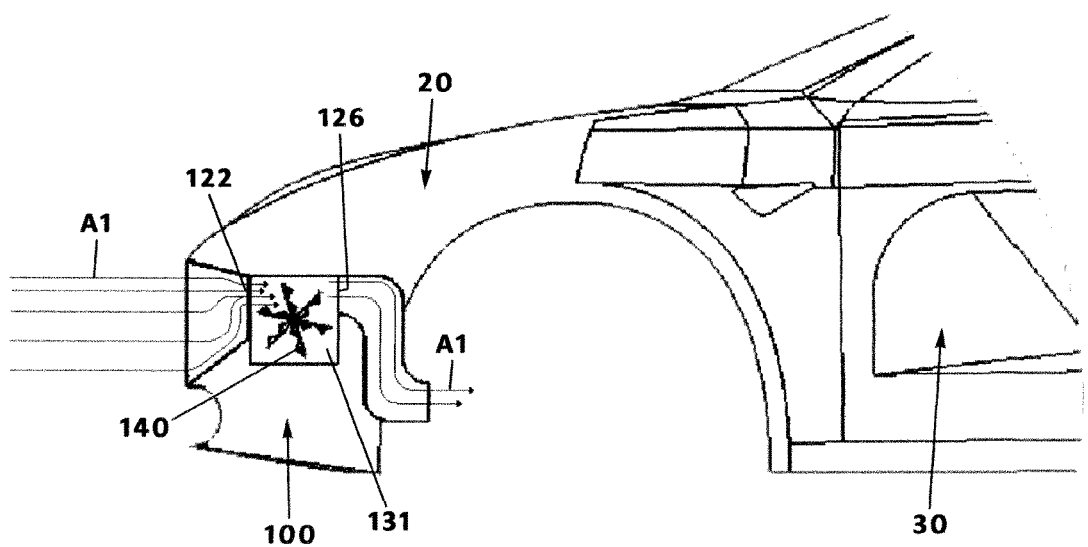

Turning now to the air duct 160, shown in FIGS. 1, 9, 10, and 11b, the air duct 160 has a plurality of walls that collectively define a channel 162 with a proximal end 162a and a distal end 162b. The proximal end 162a is open and in fluid communication with the casing outlet 126, such that the ambient air A1 passes from the casing outlet 126 into the air duct proximal end 162a. The distal end 162b is also open, such that the ambient air A1 exits under the vehicle 10 after passing through the channel 162, as shown in FIG. 11b. A lowermost point 164 of the channel proximal end 162a is preferably higher than an uppermost point 166 of the channel distal end 162b. In the illustrated embodiment, the lowermost point 164 is any point along the horizontal opening at the proximal end 162a and the uppermost point 166 is any point along the horizontal opening at the distal end 162b; in other embodiments, the lowermost and uppermost points 164, 166 may be unique points as the openings need not be shaped to have horizontal perimeters.

In use, as the vehicle 10 travels forwardly, the scoop 121 directs the ambient air A1 toward the casing inlet 122, which in turn directs the ambient air toward the blades 140 only on one side of the axis 141. The ambient air interacts with the blades 140, including the air pockets 142, and forces the blades 140 to rotate about the axis 141. Rotation of the axis 141 causes the electricity generator 150 to generate electricity (e.g., at the permanent magnet generators 152), and to ultimately store at least a portion of the generated electricity in the battery 40. After the ambient air A1 passes by the blades 140, the ambient air A1 exits the casing outlet 126. From the casing outlet 126, the ambient air A1 enters the channel 162 of the air duct 160 at the proximal end 162a, passes through the channel 162, and exits through the distal end 162b. It may be very important for the flow path of the ambient air A1 for the uppermost point 166 of the distal end 162b to be lower than the lowermost point 164 of the proximal end 162a, and for the distal end 162b to be positioned such that the ambient air A1 is not re-introduced into the engine compartment 20.

It is understood that while certain forms of this invention have been illustrated and described, it is not limited thereto except insofar as such limitations are included in the following claims and allowable functional equivalents thereof.

The invention claimed is:

1. A forced-air battery charging system for a vehicle having an engine compartment, comprising:
    a turbine assembly having a casing and a plurality of blades, said casing being positioned forwardly in the engine compartment of the vehicle and having an inlet operably receiving ambient air as the vehicle travels forwardly and having an outlet operably expelling the ambient air, said plurality of blades being situated in an interior space defined by said casing between said inlet and said outlet, said plurality of blades being operable to rotate about an axis when impacted by the received ambient air in a direction askew to said axis;
    an electricity generator operatively coupled to said plurality of blades; and
    an air duct having a plurality of walls that collectively define a channel having proximal and distal ends, said proximal end being open and in fluid communication with said casing outlet, said distal end being open through which the ambient air exits under the vehicle after passing through said air duct proximal end;
    wherein said casing inlet is configured to direct the ambient air toward the plurality of blades only on one side of the axis;
    wherein each said blade has a concave air pocket positioned to receive a portion of the ambient air therein; and
    wherein each said concave air pocket is formed from at least four generally planar walls angled relative to one another.

2. The forced-air battery charging system of claim 1, further comprising a scoop in fluid communication with the casing inlet for directing the ambient air toward the casing inlet.

3. The forced-air battery charging system of claim 1, wherein said electricity generator includes a permanent magnet generator in selective communication with a battery.

4. The forced-air battery charging system of claim 3, further comprising an inverter between said permanent magnet generator and said battery.

5. A forced-air battery charging system for a vehicle having an engine compartment, comprising:
    a turbine assembly having a casing and a plurality of blades, said casing being positioned forwardly in the engine compartment of the vehicle and having an inlet operably receiving ambient air as the vehicle travels forwardly and having an outlet operably expelling the ambient air, said plurality of blades being situated in an interior space defined by said casing between said inlet and said outlet, said plurality of blades being operable to rotate about an axis when impacted by the received ambient air in a direction askew to said axis;

an electricity generator operatively coupled to said plurality of blades; and an air duct having a plurality of walls that collectively define a channel having proximal and distal ends, said proximal end being open and in fluid communication with said casing outlet, said distal end being open through which the ambient air exits under the vehicle after passing through said air duct proximal end;

wherein:
said casing interior space has an overall height defined between an uppermost point of said casing interior space and a lowermost point of said casing interior space;

said casing inlet has an overall height defined between an uppermost point of said casing inlet and a lowermost point of said casing inlet;

said overall height of said casing inlet is no more than half as large as said overall height of said casing interior space;

wherein:
said casing outlet has an overall height defined between an uppermost point of said casing outlet and a lowermost point of said casing outlet; and said overall height of said casing outlet is no more than half as large as said overall height of said casing interior space;

wherein a lowermost point of said channel proximal end is higher than an uppermost point of said channel distal end;

wherein each said blade has a concave air pocket positioned to receive a portion of the ambient air therein;

wherein each said concave air pocket is formed from at least four generally planar walls angled relative to one another.

* * * * *